E. J. GULICK.
REAR AXLE STRUCTURE FOR AUTOMOBILES.
APPLICATION FILED APR. 25, 1912.
1,059,458.        Patented Apr. 22, 1913.
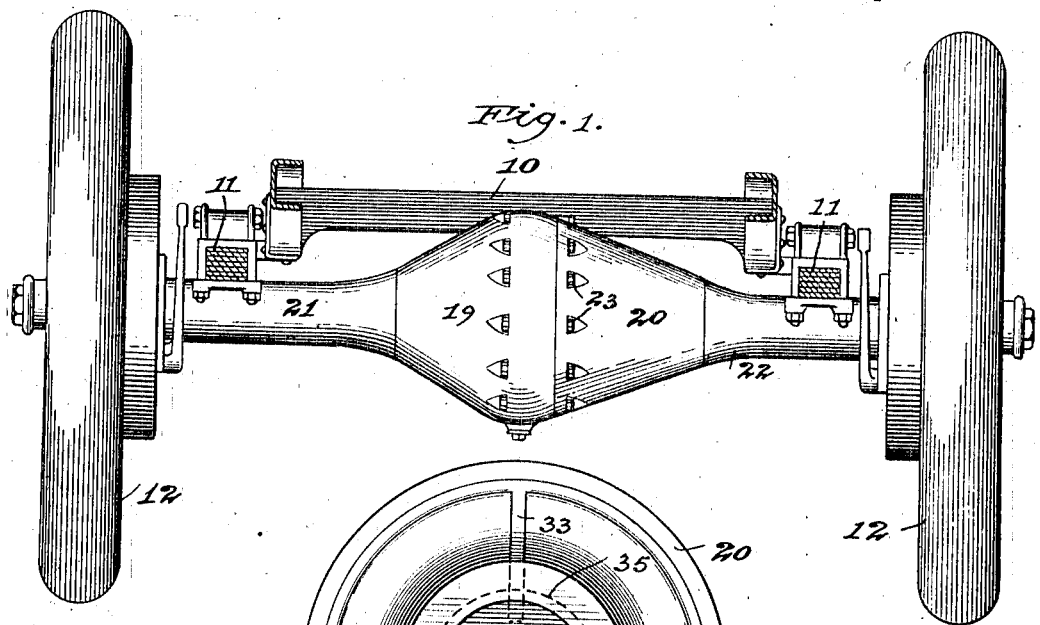
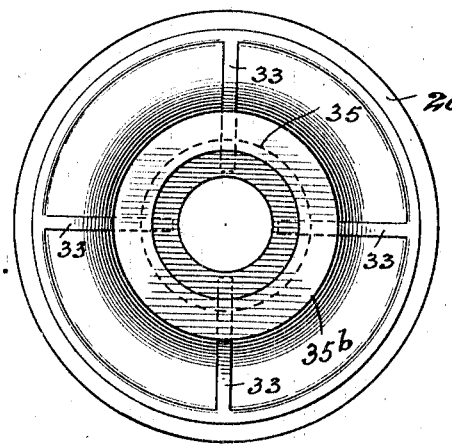
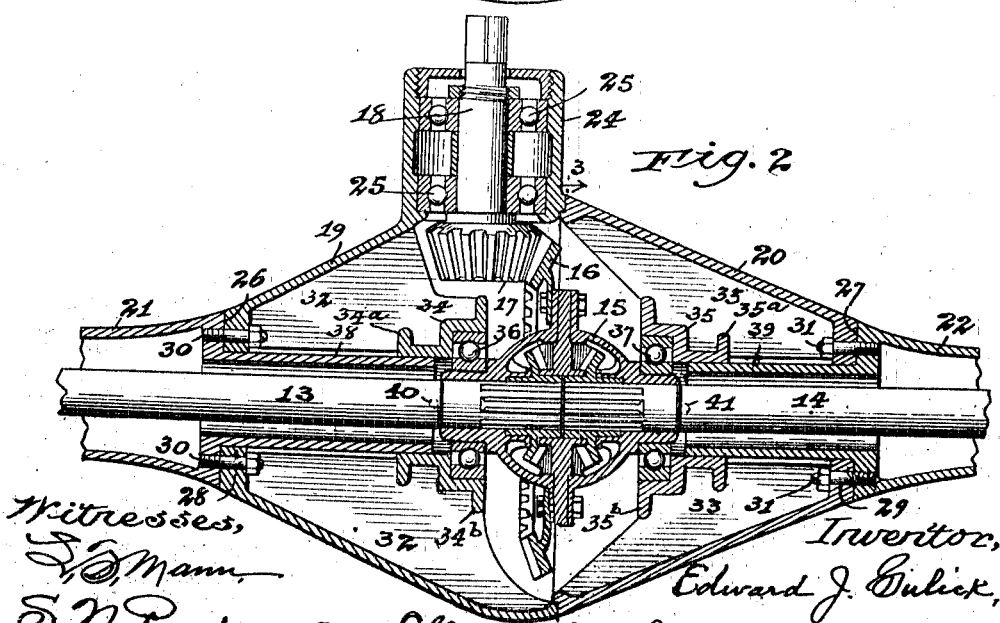

UNITED STATES PATENT OFFICE.

EDWARD J. GULICK, OF CHICAGO, ILLINOIS.

REAR-AXLE STRUCTURE FOR AUTOMOBILES.

1,059,458.  Specification of Letters Patent.  Patented Apr. 22, 1913.

Application filed April 25, 1912. Serial No. 693,098.

*To all whom it may concern:*

Be it known that I, EDWARD J. GULICK, a citizen of the United States, residing at Chicago, in the county of Cook and State of Illinois, have invented certain new and useful Improvements in Rear-Axle Structures for Automobiles, of which the following is a specification.

My present invention relates to rear axle structures for automobiles, and its main object is to provide a construction combining simplicity of structure with a high degree of strength and rigidity and capacity for resisting the bending or flexing strains of the load and maintaining the perfect axial alinement of the axle sections and differential gearing.

Another object is to provide an improved construction well adapted to confine within the intermediate enlarged portion of the axle-casing the lubricant carried therein and prevent the working out of such lubricant through the outer portions of the axle-casing to the brakes.

My invention will be readily understood when considered in connection with the accompanying drawing, forming a part of this specification, in which—

Figure 1 is a rear elevation of the rear axle, rear wheels, and a portion of the chassis frame of an automobile embodying my improvements. Fig. 2 is an enlarged horizontal section through the axle-casing and differential gear bearings. Fig. 3 is a detail view in end elevation of one section of the enlarged intermediate portion of the axle-casing, as it appears viewed on the line 3—3 of Fig. 2, and omitting the movable parts carried thereby.

Referring to the drawings, 10 designates a part of the chassis frame, 11 the rear springs, and 12 the rear wheels, all as usual.

13 and 14 designate the two axle sections connected at their meeting ends by the usual differential gearing, the bevel pinion frame or casing of which is shown at 15, the large driving gear, connected to said casing, at 16, the driving pinion at 17, and the transmission shaft at 18.

19 and 20 designate the two conical sections of the intermediate or central portion of the casing which surrounds and incloses the differential gearing and inner portions of the rear axle sections and their bearings; and 21 and 22 designate the outer or end portions of said casing that inclose the outer portions of the axle sections. The meeting ends of the casing sections 19 and 20 are strongly united by through bolts 23, and the section 19 is cast with a lateral cylindrical extension 24 that forms the casing or support for the bearings 25 of the transmission shaft 18. The end casing sections 21 and 22 are formed with annular shoulders 26 and 27, respectively, and the outer ends of the central casing sections 19 and 20 terminate in internal annular flanges 28 and 29 that are rigidly secured to the shoulders 26 and 27 of the outer casing sections 21 and 22 by tap-screws 30 and 31. The conical casing sections 19 and 20 are cast with internal radial ribs 32 and 33, respectively, the outer ends of these ribs being integral with the end flanges 28 and 29, and the inner ends of said ribs carrying integral annular bearing members 34 and 35. The inner end portions of these bearing members constitute supports or carriers for the anti-friction bearings 36 and 37 of the differential gear frame or casing 15 and for the inner end portions of the axle sections 13 and 14 which pass through the journals of the differential frame or casing 15, as is well understood. The outer end portions of the bearing members 34 and 35 are of reduced diameter, as shown in Fig. 2, and constitute supports for the inner ends of a pair of reduced sleeve-like extensions 38 and 39 of the outer axle-casing sections 21 and 22, respectively; said sleeve like extensions being integral at their outer ends with the shoulders 26 and 27 of the outer axle-casing sections. The outer and inner ends of the bearing members 34 and 35 are formed with annular radial strengthening flanges 34ª, 35ª, and 34ᵇ and 35ᵇ, respectively, which strongly reinforce both the outer and inner ends of said bearing members against the strains imposed thereon by the inner ends of sleeves 38 and 39 and the bearings of the differential gear.

From the foregoing it will be seen that the outer axle-casing sections 21 and 22 on which the weight of the rear portion of the chassis rests are strongly supported on and by the wide inner casing sections 19 and 20 at the outer ends of the latter where the broad shoulders 26 and 27 engage and are snugly bolted to the inturned flanges 28 and 29, and also, through the sleeve extensions 38 and 39, at the outer ends of the bearing members 34 and 35, said sleeves 38 and 39 being given a substantial support and bearing within said bearing members. By reason of the considerable relative length between the outer and inner supports just described, and further by reason of the fact that the bearing members or carriers 34 and 35 are cast integral with and wholly supported by the radial ribs 32 and 33 and are therefore very strongly and rigidly held in fixed position in the casing sections 19 and 20, the assembled structure possesses a very high degree of strength to resist transverse deflecting or bending strains, and the axle sections and differential gearing are at all times maintained in perfect axial alinement, thus avoiding any tendency to cramp and bind the gears and pinions of the differential gearing, and insuring the true and smooth running of the latter.

In the practical operation of the structure in an automobile, the central casing, of course, contains a considerable body of lubricant sufficient to allow the main differential driving gear 16 to constantly dip in a body of oil. The joints between the end flanges of the inner sections and the shoulders of the outer sections are oil-tight, so that no oil can escape at those points when the axle tips or is turned on end, and, of course, the sleeves 38 and 39 prevent the passage of any oil from the outer ends of the casing sections 19 and 20 into the outer casing sections 21 and 22 when the axle may be tipped or turned on end. Some oil will, of course, work through the antifriction bearings 36 and 37, but this is drained back into the main casing through drain apertures 40 and 41 formed through the bottoms of the collars 34 and 35 between the bearing 36 and the end of the sleeve 38 and between the bearing 37 and the end of the sleeve 39.

I claim:

1. In a rear axle structure for automobiles, the combination with the axle sections and the differential gearing, of a pair of intermediate axle-casing sections rigidly united at their inner ends and formed with internal annular flanges at their outer ends and with internal ribs and annular bearing members wholly supported by said ribs and themselves forming supports for the differential-gear bearings, said annular bearing members having external radial strengthening flanges at their ends, and outer axle-casing sections formed with annular shoulders engaging and rigidly secured to said internal annular flanges and formed with inwardly extending sleeves surrounding said axle sections and engaging and supported at their inner ends by the outer end portions of said annular bearing members.

2. In a rear axle structure for automobiles, the combination with the axle sections and the differential gearing, of a pair of intermediate conical axle-casing sections rigidly united at their inner wide ends and formed with internal annular flanges at their outer narrow ends and with internal radially disposed ribs and annular bearing members wholly supported by said ribs and themselves forming supports for the differential-gear bearings, said annular bearing members having external radial strengthening flanges at their ends, and outer axle-casing sections formed with annular shoulders engaging and rigidly secured to the outer faces of said internal annular flanges and formed with inwardly extending sleeves surrounding said axle sections and at their inner ends entering and supported by the outer end portions of said anuular bearing members.

3. In a rear axle structure for automobiles, the combination with the axle sections and the differential gearing, of a pair of intermediate conical axle-casing sections rigidly united at their inner wide ends and adapted to contain a body of oil and formed with internal annular flanges at their outer narrow ends and with internal radially disposed ribs and annular bearing members wholly supported by said ribs and themselves forming supports for the differential-gear bearings, said annular bearing members having external radial strengthening flanges at their ends, and outer axle casing sections formed with annular shoulders engaging and rigidly secured to said internal annular flanges and formed with inwardly extending sleeves surrounding said axle sections and engaging and supported at their inner ends by the outer end portions of said annular bearing members, said annular bearing members being also provided outwardly of the differential gear bearings with drip passages at their lower ends to conduct oil escaping through said differential-gear bearings back into the intermediate portion of the axle casing.

EDWARD J. GULICK.

Witnesses:
SAMUEL N. POND,
DAISY C. THORSEN.